(12) United States Patent
Van Der Eijk

(10) Patent No.: US 12,030,627 B2
(45) Date of Patent: Jul. 9, 2024

(54) ADAPTIVE STRUCTURE

(71) Applicant: GKN Aerospace Services Limited, Solihull (GB)

(72) Inventor: Wouter Van Der Eijk, Solihull (GB)

(73) Assignee: GKN Aerospace Services Limited, Solihull (GB)

( * ) Notice: Subject to any disclaimer, the term of this patent is extended or adjusted under 35 U.S.C. 154(b) by 220 days.

(21) Appl. No.: 17/618,051

(22) PCT Filed: Jun. 18, 2020

(86) PCT No.: PCT/GB2020/051478
§ 371 (c)(1),
(2) Date: Dec. 10, 2021

(87) PCT Pub. No.: WO2020/254812
PCT Pub. Date: Dec. 24, 2020

(65) Prior Publication Data
US 2022/0306280 A1    Sep. 29, 2022

(30) Foreign Application Priority Data

Jun. 18, 2019   (GB) ..................................... 1908723

(51) Int. Cl.
*B64C 3/44*    (2006.01)
*B64C 9/00*    (2006.01)
(Continued)

(52) U.S. Cl.
CPC .................. *B64C 3/44* (2013.01); *B64C 9/00* (2013.01); *B64C 9/02* (2013.01); *B64C 3/26* (2013.01); *B64C 2003/445* (2013.01); *B64C 7/00* (2013.01)

(58) Field of Classification Search
CPC ....... B64C 3/44; B64C 2003/445; B64C 9/00; B64C 9/02
See application file for complete search history.

(56) References Cited

U.S. PATENT DOCUMENTS

2007/0262201 A1   11/2007   Cox et al.
2010/0224734 A1   9/2010   Grip
(Continued)

FOREIGN PATENT DOCUMENTS

EP    2423104 A1   2/2012
EP    2604509 A2   6/2013
JP    2014037155 A   2/2014

OTHER PUBLICATIONS

Hiraki Takahashi et al: "Development of variable camber wing with morphing leading and trailing sections using corrugated structures", Journal of Intelligent Material Systems and Structures., vol. 27, No. 20, Dec. 28, 2016 (Dec. 28, 2016), pp. 2827-2836.*
(Continued)

*Primary Examiner* — Richard G Davis
(74) *Attorney, Agent, or Firm* — Bejin Bieneman PLC

(57) ABSTRACT

A deformable aerospace structure includes a first layer and a second layer spaced from the first layer and defining a space therebetween. The space includes one or more reinforcement elements extending between the first layer and the second layer. The ends or portions of the reinforcement element(s) proximate to the first layer are connected thereto and ends or portions of the reinforcement element(s) proximate to the second layer are moveable with respect to ends or portions of adjacent reinforcement element(s) proximate to the second layer.

14 Claims, 6 Drawing Sheets

(51) Int. Cl.
*B64C 9/02* (2006.01)
*B64C 3/26* (2006.01)
*B64C 7/00* (2006.01)

(56) References Cited

U.S. PATENT DOCUMENTS

| | | |
|---|---|---|
| 2015/0251747 A1 | 9/2015 | Roe et al. |
| 2016/0233410 A1 | 8/2016 | Wilkie et al. |
| 2017/0066519 A1* | 3/2017 | Mabe .................... F02K 1/10 |
| 2018/0370613 A1 | 12/2018 | Van Pelt et al. |
| 2019/0256189 A1 | 8/2019 | Fenske |

OTHER PUBLICATIONS

Dayyani I et al: "The mechanics of composite corrugated structures: A review with applications in morphing aircraft", Composite Structures, Elsevier Science Ltd, GB, vol. 133, Jul. 26, 2015 (Jul. 26, 2015), pp. 358-380, XP029282162.*

Hiroki Takahasi et al: "Devleopment of variable camber wing with morphing leading and trailing sections using corrugated structures", Journal of Intelligent Material Systems and Structures, vol. 27, No. 20, Dec. 28, 2016, pp. 2827-2836, XP055728334, US ISSN: 1045-389X, DOI: 10.1177/1045389X16642298.

International Search Report and Written Opinion for PCT/GB2020/051478 mailed Jun. 18, 2020 (14 pages).

Dayyani I et al: "The mechanics of composite corrugated structures: A review with applications in morphing aircraft", Composite Structures, Elsevier Science Ltd., GB, vol. 133, Jul. 26, 2015, pp. 358-380, XP029282162, ISSN: 0263-8223, DOI: 10.1016/J.Compstruct. 2015.07.099.

UKIPO Combined Search and Examination Report under Section 17 and 18(3) for Application No. GB1908723.8 mailed Dec. 11, 2019 (6 pages).

UKIPO Office Action for Application No. GB1908723.8 mailed Aug. 31, 2021 (8 pages).

UKIPO Search Report under Section 17(6) for Application No. GB1908723.8 mailed Aug. 31, 2021 (7 pages).

* cited by examiner

ADAPTIVE STRUCTURE

CROSS-REFERENCE TO RELATED APPLICATIONS

This application is a national stage of, and claims priority to, Patent Cooperation Treaty Application No. PCT/GB2020/051478, filed on Jun. 18, 2020, which application claims priority to Great Britain Application No. GB 1908723.8, filed on Jun. 18, 2019, which applications are hereby incorporated herein by reference in their entireties.

BACKGROUND

Conventional movable aerodynamic structures used on aircraft include an aerodynamic structure which is mounted to the aircraft wing, body or engine (or the like) by means of a hinge arrangement. The movable structure can then be rotated about the hinge to change the overall aerodynamic performance.

Moveable structures on aircraft include flaps, ailerons, spoilers, tail wings and various other components arranged, in use, to guide or control airflow over an aircraft structure. Ailerons, as one example, are coupled to the main wing structure by means of hinge arrangements allowing the aileron to be rotated about a pivot to change the flow direction of air.

Actuators, such as electric motors, hydraulic pumps, worm gears or the like, are used to pivot and move the moveable structures about the hinge thereby changing the aerodynamic performance and characteristics of the structure. This allows for controlled aircraft flight by movement of the structure.

For example, an aircraft flap is conventionally mounted to the trailing edge of a wing by means of a series of hinges located along the length of the wing. The flap is coupled to a series of actuators which, when activated, cause the flap to rotate changing the aerodynamic performance of the wing and increasing lift. Such arrangements have been used for decades in aircraft design and are robust, reliable and generally provide adequate aerodynamic performance.

However, the present inventor has identified an alternative approach to moveable aerodynamic structures which provides a structure with a continuous surface which can adapt in shape so as to change the aerodynamic performance of a component. The invention provides a highly adaptable surface without a complex internal structure or actuation arrangement thereby additionally improving reliability and offering a low maintenance solution which is of importance in allowing for the economical operation of aircraft.

SUMMARY

The present disclosure relates to an adaptive structure, for example an adaptive aerodynamic structure, that is capable of adapting or changing in shape. The disclosure includes a deformable aerospace structure, a deformable fluid directing structure, a deformable structure for an aircraft component, and an aircraft, aircraft engine, or wind turbine blade having such structures.

In an implementation, a deformable aerospace structure includes a first layer and a second layer spaced from the first layer and defining a space therebetween. The space may include one or more reinforcement elements extending between the first layer and the second layer, wherein the ends or portions of the reinforcement element(s) proximate to the first layer are connected thereto and ends or portions of the reinforcement element(s) proximate to the second layer are moveable with respect to ends or portions of adjacent reinforcement element(s) proximate to the second layer.

By allowing the points at which the reinforcement elements meet the second layer to be moveable relative to each other, a structure may be provided that is flexible and can be deformed while maintaining a smooth continuous surface on an opposing side of the structure (for example an airflow facing surface). The reinforcement elements, combined with the way they are coupled or connected to each of the first and second layers, may provide a desired level of structural strength while also allowing for the curvature of the structure when actuated with a suitable actuator.

The term deformable as used herein is intended to refer to a structure which can change in shape and, in particular, to bend or flex so are to form a generally curved, concave or convex shape.

The reinforcement elements may be any suitable member and may, for example, be a plurality of discrete and individual elements extending between the two layers. The elements may be arranged at an angle with respect to the two surfaces which is less than 90 degrees.

The elements may be arranged at the same angle or at different angles to provide for different characteristics along the structure. In an example, the reinforcement element(s) may be in the form of a plurality of adjacent members each alternating in direction and extending from the first layer to the second layer.

In another example, the reinforcement member may be in the form of a continuous member configured to alternate between the first and second layers along its length. Thus, instead of a plurality of individual elements, a single element can be formed, such as a corrugated element, and located between the two layers. This may reduce the number of connections and simplify construction and manufacturing by minimising the number of components.

In an example, the second layer may be in the form of one or more elastic elements connecting adjacent reinforcement elements together. The elastic elements may then permit the relative movement of adjacent reinforcement elements at the second layer. As described above, relative movement of these points allows for curvature of the structure.

For example, the elastic elements may be in the form of elastic or metal springs.

In another example, the second layer may be formed of a continuous elastomeric layer encapsulating the ends or portions of the reinforcement elements proximate thereto. Thus, the ends (or portions if the reinforcement element is a corrugated arrangement) of each of the reinforcement elements is secured within the elastomeric layer. Because of the elastomeric properties, not only is the reinforcement element secured, but it is also permitted to move by virtue of the flexibility of the material.

At the ends of the reinforcement elements proximate to the first layer, each adjacent element may be connected to the inner surface of the first layer at a common point or along a common line, i.e., at the same position. This provides a V or apex structure that provides rigidity and strength to the first layer and reinforcement layer.

Thus, providing a difference in the way adjacent ends of each reinforcement element are connected together results in a difference in the stiffness of each side of the structure; for example, the first layer may have a greater stiffness than the second layer. The stiffness between adjacent points at which the reinforcement elements connect to the first layer may be greater than the stiffness between adjacent points at which the reinforcement elements connect to the second layer.

In an aerospace application, the first layer may include an airflow facing outer surface and a reinforcement element facing inner surface. The airflow facing outer surface may then become part of a continuous aerodynamic surface, such as a spoiler, flat or the like.

The structure may be formed of any suitable combination of materials while retaining the stiffness requirements described above. For example, the first layer and the reinforcement elements may be formed from a carbon fiber reinforced plastic or aluminium material and the second layer may be formed from a continuous rubber or silicone elastomer layer.

In an example, the reinforcement element may be in the form of a corrugated member alternating between the first and second layers along its length and defining a plurality of generally V shaped sections. The one or more V shaped sections may incorporate a supplemental reinforcement member arranged transverse or perpendicularly with respect to the first layer and second later and having a first end extending into an elastomeric layer forming the second layer and a second end extending into an elastomeric material arranged within the base of the V shaped section proximate to the first layer. Such an arrangement may provide enhanced stiffness within the structure.

In another implementation, a deformable fluid directing structure includes a first layer and a support layer spaced from the first layer and defining a space therebetween. The space includes one or more reinforcement elements extending between the first layer and the support layer, wherein the ends or portions of the reinforcement element(s) proximate to the first layer are connected thereto and ends or portions of the reinforcement element(s) proximate to the support layer are encapsulated within an elastomeric layer.

In various examples, the Young's Modulus of Elasticity (E) of the elastomeric layer may be between 80 and 120 MPa, between 90 and 110 MPa, or greater than 100 MPa.

In yet another implementation, a deformable structure for an aircraft component includes a first airflow facing layer and a second opposing layer defining a space between the first and second layers. The modulus of elasticity of the first airflow facing layer may be greater than the modulus of elasticity of the second layer.

In an example, the space includes a reinforcing or support layer such as a corrugated metallic or carbon fiber layer which transfers the shear loads between the airflow facing layer and the second layer. This triple layer arrangement may allow the structure to change in shape while allowing the loads caused by air impinging on the structure to be transferred to the second layer.

The reinforcement layer may itself be a continuous layer or material with an intermediate modulus of elasticity between the airflow facing layer and the second layer. In effect, a laminate structure may be provided with a different modulus of elasticity for each of the three (or more) layers (decreasing from the airflow side to the second internal side, i.e., internal to the aircraft structure).

In the case of a rubber being used for the second layer, the material properties may allow the layer to stretch. The relative thicknesses of each of the layers may be suitably selected to accommodate the desired loads for the structure and the amount of curvature needed.

In a further implementation, an aircraft, aircraft engine, or wind turbine blade includes a deformable aerospace structure as described herein.

BRIEF SUMMARY OF THE DRAWINGS

Aspects of the disclosure will now be described, by way of example only, with reference to the accompanying figures in which.

Figure 1A:
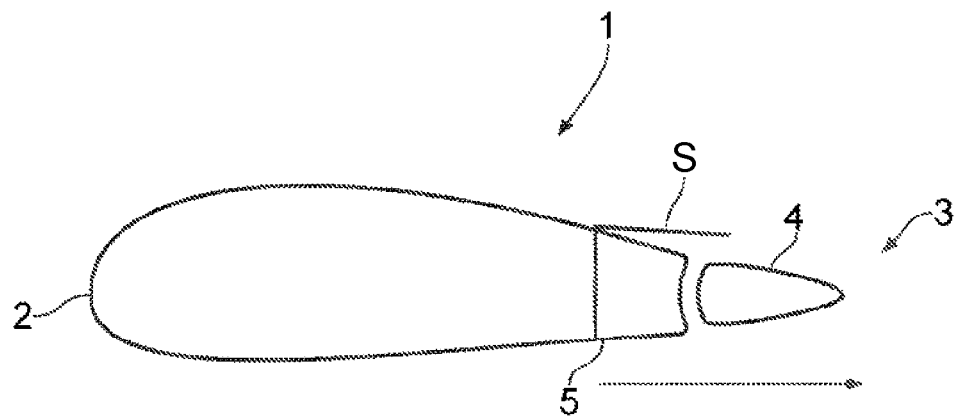
FIGS. 1A and 1B show a schematic of a conventional example of a moveable structure of an aircraft wing.

While the inventive concepts are susceptible to various modifications and alternative forms, specific implementations are shown by way of example in the drawings and are herein described in detail. It should be understood however that drawings and detailed description attached hereto are not intended to limit the disclosure to the particular form disclosed, but rather the disclosure is to cover all modifications, equivalents and alternatives falling within the inventive concepts as claimed. As used in this specification, the words "comprises", "comprising", "include", "including", and similar words are not to be interpreted in an exclusive or exhaustive sense. In other words, they are intended to mean "including, but not limited to".

It will be recognised that the features of the inventive concepts described herein can conveniently and interchangeably be used in any suitable combination. It will also be recognised that the disclosure covers not only individual implementations, but also combinations of the implementations disclosed herein.

DETAILED DESCRIPTION

The present disclosure is concerned with a deformable or morphing structure with an aerodynamic profile. This may include, but is not limited to, a flap, trailing edge, leading edge, spoiler, air inlet or the like. Specifically, the disclosure provides such a structure that is capable of minimizing a number of actuators and eliminate the use of hinges.

The structure described herein provides a deformable aerospace structure which advantageously: (1) Can transfer loads (with no buckling or large deformations are acceptable when loaded under aerodynamic or structural loads); (2) Resists failure due to high internal stresses (mostly caused by the bending stresses when forced into desired shape); and (3) Is flexible (can be morphed into the desired shape. Large deformations are needed under actuation loads).

The implementations described herein provide an arrangement in which elements and materials with a significant difference in stiffness in an axial direction are combined in a structure in such a way that the bending stiffness of the complete structure is enlarged while the maximum stress in the elements remains at an acceptable level when the structure is morphed/bended.

The inventive concepts will now be described in detail with reference to the figures.

Figure 1B:
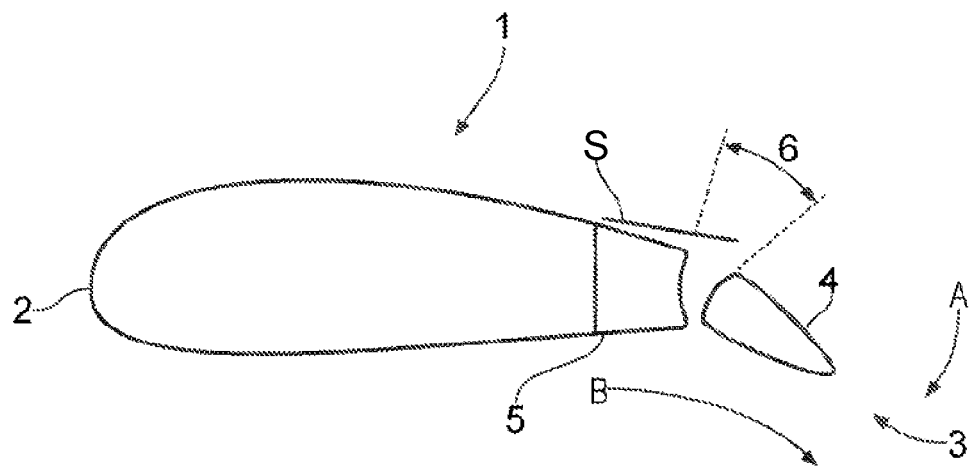

FIGS. 1A and 1B are schematic end views of an aircraft wing 1 viewed in cross-section towards the fuselage of the aircraft. The wing includes a leading edge 2 and a trailing edge 3. FIGS. 1A and 1B illustrate one example of a conventional moveable structure on an aircraft. The structure shown is a flap 4 which is movable about a pivot (not shown) proximal to the trailing edge of the main wing box 5. The arrow A in FIG. 1B illustrates how the flap can then be moved about the pivot. Movement causes the distal part of the flap from the pivot to move in an arc which in the case of the flap causes the airflow to change in direction (see arrow B) and to generate more lift.

FIGS. 1A and 1B represent just 1 location of a moveable component on an aircraft structure. Other examples include wing flaps, the tail wings, tail rudder, air inlets, spoilers, and even the landing gear doors. It will be recognised that the arrangements and methods described herein can be applied to any conventionally hinged arrangement for an aircraft structure.

An implementation of the present disclosure will now be provided with reference to one of these movable components, namely a wing spoiler.

The location of a typical wing spoiler is shown in FIGS. 1A and 1B by reference S. The spoiler can serve multiple functions. For example, the spoiler may be rotated in a vertical direction to increase drag on landing or to change the aerodynamic profile to slow the aircraft in flight. The spoiler is operated by rotating the spoiler about a pivot located at its upstream edge, with the trailing edge entering and disturbing the airflow to cause the desired drag.

In another arrangement, the spoiler can be used to bridge the gap which is formed when the flaps shown in FIGS. 1A and 1B are deployed or activated.

As shown in FIG. 1B, the flaps 4 have been deployed to increase the lift generated by the wing. As shown in FIG. 1B, a gap 6 is generated at the trailing edge of the wing box as the flap is deployed and rotates away from the wing box body. This gap is generally undesirable since it is detrimental to the efficient airflow over the wing surface. To counter this, a spoiler S may be arranged so as to extent over part of the gap to increase efficiency.

However, because of the way the flap rotates and the flat structure of the spoiler, there is always an unwanted gap along the trailing edge of the wing box. The present disclosure addresses this problem and provides a unique, uninterrupted aerodynamic surface that can conveniently change in shape to provide a continuous aero-surface.

The composition of the structure according to the present disclosure will be explained with reference to FIG. 2, which is a cross-section through the structure 7.

The adaptive or dynamic structure 7 includes an upper or outer first layer 8 and an opposing lower or second layer 9. A gap or space h is defined between the two surfaces or layers. The upper layer 8 is the air-facing layer in this example and has an upper outer surface against which air is caused to flow in flight. It is this surface which receives the air pressure and therefore the associated forces.

In the example shown, an undulating or corrugated reinforcement or support member 10 is positioned between the two layers. This layer is arranged in a generally V-shaped cross-section with opposing apexes of the V extending to the first and second layers 8 and 9, as shown in FIG. 2.

The precise geometry of the corrugated member 10 will depend on the particular application for the structure, including the angles of the V cross-sections, height, and thickness. The material used may also be adapted, depending on the structure requirements of the component.

Similarly, the material used to form the first and second layers 8 and 9 may be selected according to the anticipated forces and desired deflection.

At the points at which the corrugated reinforcement elements meet the first layer, the reinforcement element is connected or bonded to the inner surface of the first layer (reference 11). Depending on the material used, this bonding may be by an adhesive, by co-curing, or by welding. Thus, the reinforcement element is firmly fixed or connected to the top of the adjacent reinforcement element at each apex or a subset thereof.

The first upper surface or layer may be a carbon fiber reinforced plastic (CFRP) or a metal such as aluminium or titanium. In an example of a spoiler, it may be an aluminium layer between 1 and 1.6 mm thick. Similarly, the reinforcement element may be formed of CFRP or aluminium between 0.6 and 1.2 mmm thick.

Figure 2:
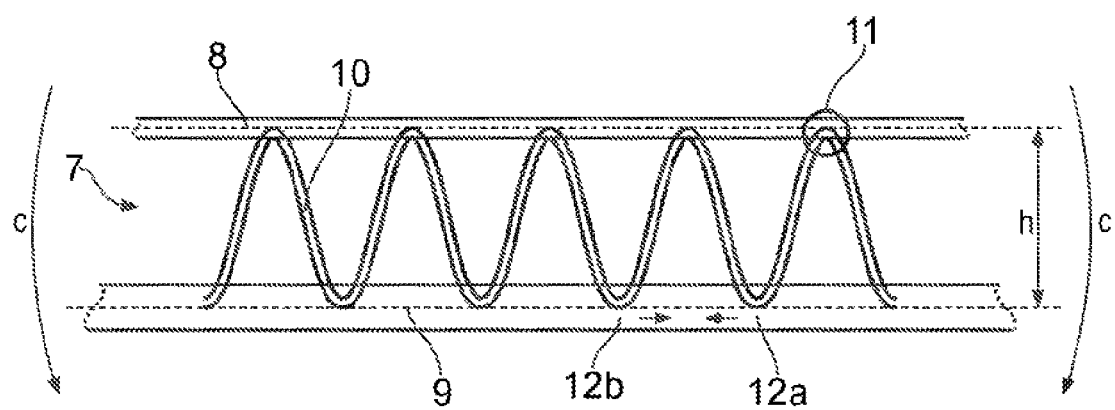
FIG. 2 shows a cross-section through a structure according to an implementation of the inventive concepts described herein.

In the example shown in FIG. 2, the opposing apexes of the reinforcement elements extend into the second layer 9, as shown at the bottom of FIG. 2. Thus, the ends of the reinforcement elements which extend to the second layer may be encapsulated within the second layer as opposed to being bonded or connected to the layer, as described above with reference to the first layer (for example by means of welding).

The second layer shown in FIG. 2 is an elastomeric material such as silicone or rubber, which has a Young's modulus of elasticity of approximately 100 MPa, having a thickness of 6 mm. Thus, the ends or portions of the corrugated reinforcement element 10 are entirely encapsulated in a flexible (or semi-flexible) material.

This conveniently allows these ends of the corrugated reinforcement element to move with respect to adjacent portions of the reinforcement element encapsulated within the second layer. This is illustrated at reference numerals 12a and 12b and the associated arrows. It will be recognised that bending or flexing the structure about the direction of arrow C will cause the portions 12a and 12b to move together. Conversely, bending the panel in the opposite direction acts to move the portions 12a and 12b apart. Because of this permissible movement of adjacent portions of the reinforcement element, the structure can accommodate bending forces and thereby flex and bend without fracturing or breaking.

It will also be recognised that, because of the connection or bond at points 11, the structure retains structural strength. The exact strength and rigidity of the structure will depend on the materials used, the thicknesses, and the associated relative modulus of elasticity of the first layer and reinforcement elements versus the modulus of elasticity of the second layer, i.e.

Modulus of elasticity of first layer combined with reinforcement layer=$E_F E_R$ Modulus of elasticity of the second layer alone=$E_S$ $E_F E_R > E_S$ This relationship ensures that the structure is permitted to conveniently flex while maintaining a continuous and uninterrupted surface of the first layer.

Another alternative implementation is described below with reference to FIGS. 7A and 7B.

Figure 3:
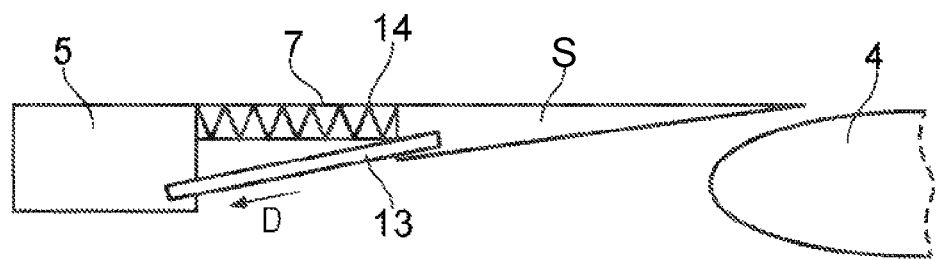
FIG. 3 shows a flap and spoiler arrangement in an un-deployed flap state.
Figure 4:
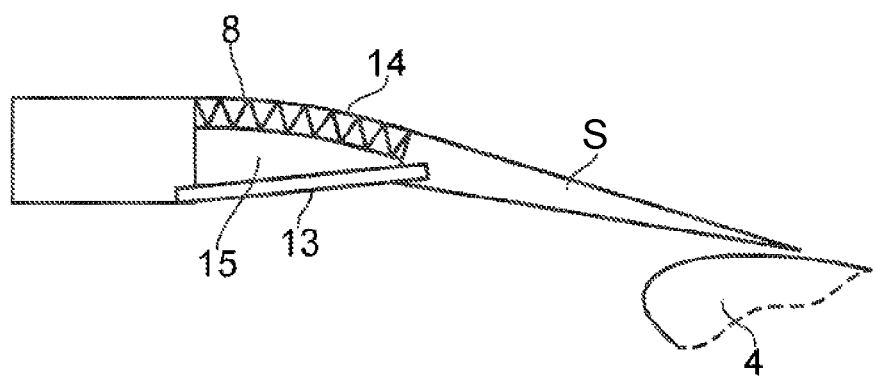
FIG. 4 shows a flap and spoiler arrangement in a deployed flap state.

FIGS. 3 and 4 illustrate an application for the structure described herein, namely a spoiler with an adaptive surface that does not require a hinge arrangement.

Referring to FIG. 3, the deformable or deflectable structure 7 is located between the wing box 5 and the spoiler S. The trailing edge of the spoiler S overlaps with the leading edge of the flap 4 in normal flight to provide a continuous surface.

An actuator 13 is shown, which is coupled to the spoiler S. Movement of the actuator 13 along the direction of the arrow D will cause movement of the spoiler in a downward direction.

Ordinarily, without the structure 7, a hinge may be required to connect the spoiler to the wing box 5, i.e., to provide a pivot about which the spoiler can rotate. However, the present disclosure provides not only the hinge functionality, but also a smooth and continuous surface 14.

Referring to FIG. 4, the flap has been deployed and the actuator 13 activated to cause the spoiler to follow the rotation of the flap in a downward direction. As shown, because of the way the points at which the reinforcement elements of the deflectable structure can move relative to each other, the structure 7 can conveniently bend or deform into the curve 15 shown in FIG. 4. This allows the first upper surface 8 to bend and provide a smooth arc between the wing box and the spoiler.

This advantageously increases the effectiveness of the flaps and improves aerodynamic performance. It will be recognised by those skilled in the art that any increase in aerodynamic performance can allow components and structures to be made smaller and thus save weight.

It will also be recognised that operating the actuator in the opposite direction will cause an opposite arc of the deformable structure 7 and the spoiler moves in an upward direction (for example in an application where the spoiler functions to increase drag).

This is further illustrated with reference to FIG. 5, which illustrates the forces and nodes of one embodiment of a deformable structure described herein.

The arrangement described herein redistributes loads in such a way that the structure can be morphed or deformed into different shapes without creating unacceptable high stresses in the materials while also allowing the structure to transfer the applied structural and aerodynamic loads.

Figure 5:
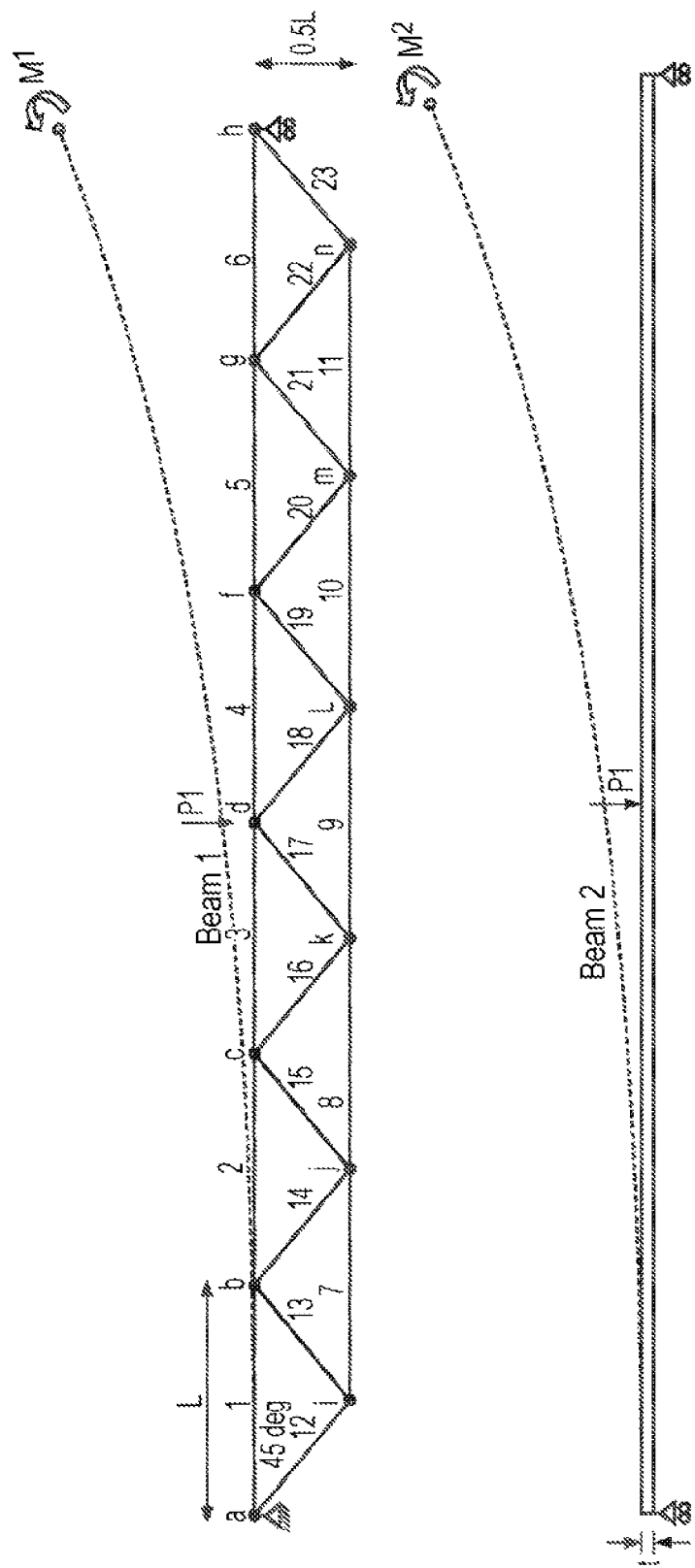
FIG. 5 shows force diagrams for the structure described herein.

Referring to FIG. 5, elements 1 to 6 form the primary skin surface (the first layer). Thus, a continuous skin is provided from point a to point h with certain properties of (length, width, thickness, and stiffness).

Elements 12 to 23 form a corrugated internal reinforcement layer or elements within the structure, again with certain properties (length, width, thickness, and stiffness).

Elements 7 to 11 represent the support or second layer with a much lower stiffness than the primary skin and the reinforcement layer. Here, the selected material may be rubber, for example, with a certain thickness t such that no buckling failure of this element is possible.

An alternative arrangement, replacing the elastomer with a spring, is described below with reference to FIG. 7.

As discussed above, the important relationship is that the total axial stiffness between adjacent apexes in the elastomer layer is much lower than the axial stiffness of the first layer and reinforcement elements combined.

As shown in FIG. 5, the structure has been deflected or deformed in an opposite direction to that shown in FIG. 4. The upper load diagram shows a cross-section through the structure as described herein and the lower load diagram shows a normal skin. The dotted lines indicate the deformed positions.

The inventor has established the following observations in developing the deformable or morphing structure. A first principle is that the deformation of the skin when loaded under an aerodynamic pressure should remain at a certain acceptable level. In FIG. 5 the force P1 represents the aerodynamic loading.

When the structure described herein and the normal conventional skin element are both optimized to meet this requirement and their deformation as a result of the loading P1, the thickness of the structure described herein can be much thinner than the thickness of the normal conventional skin.

A second principle is that the stresses in the skin should remain at an acceptable level when the structure is loaded with an action force. In FIG. 1 the actuation force is represented by the moment M1 and M2.

When the structure described herein and the normal conventional skin element are both pushed into an equal morphed shape, the stresses in the normal skin will be much higher (and in most of the practical applications unacceptable) than the stress in the innovative structure described herein because of the difference in skin thickness.

Figure 6:
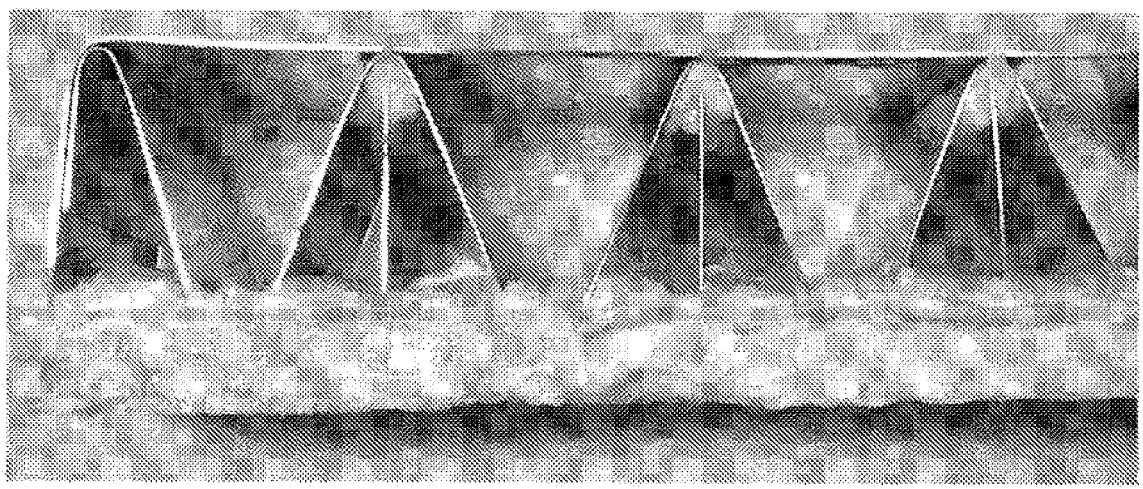
FIG. 6 shows a cross-section through an example arrangement of adaptive structure described herein.

FIG. 6 shows a cross-section of an example (prototype) deformable aerospace structure where the elastomeric layer is clearly visible at the bottom of the image. In addition, further reinforcement elements are shown located with each V shaped reinforcement. The lower end of these additional reinforcement elements is encapsulated within the second layer and at an opposing end (in the apex closest to the first layer) another bead of elastomeric material is provided to receive the opposing end of the additional reinforcement. This structure provides still further strength which allowing the structure to retain its deformable properties.

Figure 7A:
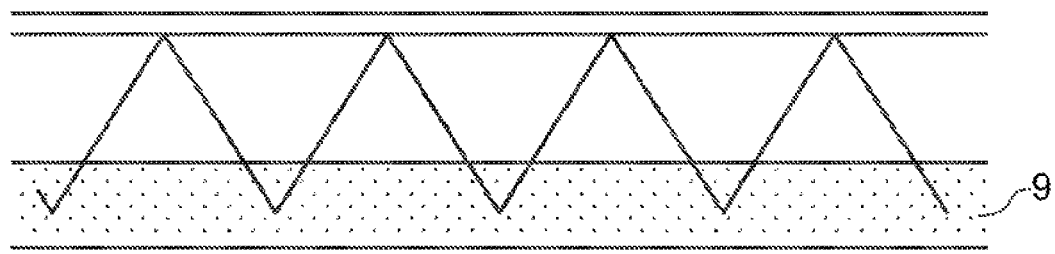
FIGS. 7A and 7B show two alternative implementations described herein.
Figure 7B:
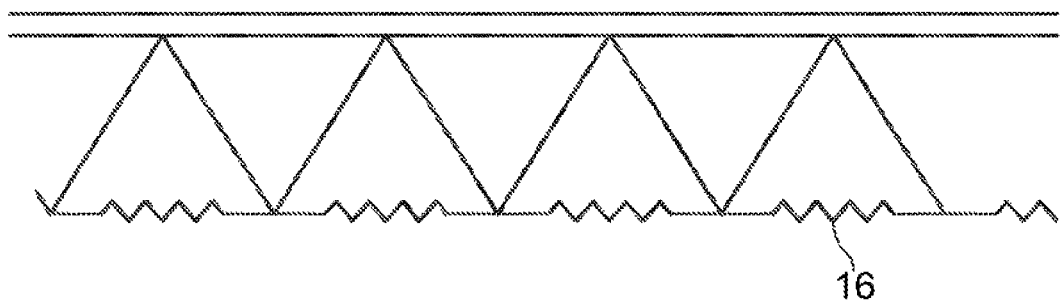

Referring to FIGS. 7A and 7B, an alternative arrangement is described. As shown in FIG. 7A the structure described above is shown using an encapsulating elastomeric layer. Another way to provide the same or similar elastic properties is to use a spring 16 to define the second 'layer'. It will be recognised that the elastomeric option allows for functionality in two directions whereas the spring embodiment allows functionality in a single direction.

In an arrangement where an elastomeric or rubber layer is used, the layer may incorporate spaces or apertures across its surface or its depth or allow for compression of the layer. This may then allow greater curvature of the structure, i.e., a tighter bent structure or curve.

It will be recognised that implementations described herein can be applied to a variety of fluid controlling or directing components where a hinge would ordinarily be used and where a smooth surface can be advantageous.

The invention claimed is:

1. A deformable aerospace structure, the structure comprising:
a first layer;
a second layer spaced from the first layer and defining a space therebetween; and
a reinforcement element disposed in the space and extending between the first layer and the second layer, wherein the second layer is comprised of one or more elastic elements connecting the reinforcement element to an adjacent reinforcement element, and wherein the elastic elements comprise springs,
wherein an end or portion of the reinforcement element proximate to the first layer is connected thereto, and an end or portion of the reinforcement element proximate to the second layer is moveable with respect to an end or portion of the reinforcement element or an adjacent reinforcement element proximate to the second layer.

2. The deformable aerospace structure of claim 1, wherein the reinforcement element includes a plurality of adjacent members, each alternating in direction and extending from the first layer to the second layer.

3. The deformable aerospace structure of claim 2, wherein the reinforcement element is a reinforcement member in the form of a continuous member configured to alternate between the first and second layers along its length.

4. The deformable aerospace structure of claim 1, wherein the second layer is comprised of a continuous elastomeric layer encapsulating the ends or portions of the reinforcement elements proximate thereto.

5. The deformable aerospace structure of claim 1, wherein the ends or portions of adjacent reinforcement elements proximate to the first layer are connected to the first layer at the same position.

6. The deformable aerospace structure of claim 1, wherein a stiffness between adjacent points at which the reinforcement element or elements connect to the first layer is greater than a stiffness between adjacent points at which the reinforcement element or elements connect to the second layer.

7. The deformable aerospace structure of claim 1, wherein the first layer comprises an airflow facing outer surface and a reinforcement element facing inner surface.

8. The deformable aerospace structure of claim 1, wherein the first layer and the reinforcement elements are formed from a carbon fiber reinforced plastic or aluminum material, and
the second layer is formed from a rubber or silicone elastomer layer.

9. The deformable aerospace structure of claim 1, wherein the reinforcement element is comprised of a corrugated member alternating between the first and second layers along its length and defining a plurality of generally V shaped sections.

10. The deformable aerospace structure of claim 9, wherein one or more of the V shaped sections incorporates a supplemental reinforcement member arranged perpendicularly with respect to the first layer and second layer, and
the supplemental reinforcement member comprises a first end extending into an elastomeric layer forming the second layer and a second end extending into an elastomeric material arranged within the base of the V shaped section proximate to the first layer.

11. The deformable aerospace structure of claim 1, wherein the deformable aerospace structure is disposed on an aircraft wing.

12. The deformable aerospace structure of claim 1, wherein the deformable aerospace structure is disposed on a wind turbine blade.

13. The deformable aerospace structure of claim 1, wherein the deformable aerospace structure is disposed on an aircraft component selected from the group consisting of a wing flap, a tail wing, a tail rudder, an air inlet, a spoiler, and a landing gear door.

14. A deformable aerospace structure, the structure comprising:
a first layer;
a second layer spaced from the first layer and defining a space therebetween; and
a reinforcement element disposed in the space and extending between the first layer and the second layer,
wherein an end or portion of the reinforcement element proximate to the first layer is connected thereto, and an end or portion of the reinforcement element proximate to the second layer is moveable with respect to an end or portion of the reinforcement element or an adjacent reinforcement element proximate to the second layer;
wherein the reinforcement element is comprised of a corrugated member alternating between the first and second layers along its length and defining a plurality of generally V shaped sections;
wherein one or more of the V shaped sections incorporates a supplemental reinforcement member arranged perpendicularly with respect to the first layer and second layer, and the supplemental reinforcement member comprises a first end extending into an elastomeric layer forming the second layer and a second end extending into an elastomeric material arranged within the base of the V shaped section proximate to the first layer.

* * * * *